US010830213B2

(12) United States Patent
Hales et al.

(10) Patent No.: US 10,830,213 B2
(45) Date of Patent: Nov. 10, 2020

(54) DETERMINATION OF WIND TURBINE CONFIGURATION

(71) Applicant: VESTAS WIND SYSTEMS A/S, Aarhus (DK)

(72) Inventors: Kelvin Hales, Surrey (GB); Chris Spruce, Leatherhead (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 540 days.

(21) Appl. No.: 15/529,222

(22) PCT Filed: Nov. 23, 2015

(86) PCT No.: PCT/DK2015/050361
§ 371 (c)(1),
(2) Date: May 24, 2017

(87) PCT Pub. No.: WO2016/082838
PCT Pub. Date: Jun. 2, 2016

(65) Prior Publication Data
US 2017/0328346 A1 Nov. 16, 2017

(30) Foreign Application Priority Data
Nov. 24, 2014 (DK) .................................. 2014 70731

(51) Int. Cl.
*F03D 13/30* (2016.01)
*F03D 7/02* (2006.01)
(Continued)

(52) U.S. Cl.
CPC .............. *F03D 13/30* (2016.05); *F03D 7/02* (2013.01); *F03D 7/046* (2013.01); *F03D 80/00* (2016.05);
(Continued)

(58) Field of Classification Search
CPC combination set(s) only.
See application file for complete search history.

(56) References Cited

U.S. PATENT DOCUMENTS 8,050,899 B2 * 11/2011 Giguere ................. G06Q 10/06
703/6
9,624,905 B2 * 4/2017 Perley ................... F03D 7/0292
(Continued)

FOREIGN PATENT DOCUMENTS

CN 101482448 A 7/2009
CN 102072085 A 5/2011
(Continued)

OTHER PUBLICATIONS

Chinese Office Action for Application No. 201580070771.1 dated Aug. 31, 2018.
(Continued)

*Primary Examiner* — Woody A Lee, Jr.
(74) *Attorney, Agent, or Firm* — Patterson + Sheridan, LLP

(57) ABSTRACT

Determination of Wind Turbine Configuration The present invention relates to a method and computer system for determining a configuration of a wind turbine of a given wind turbine type, the method comprising the steps of: storing in a database a plurality of combinations of physical and control parameters of the wind turbine that can be varied; determining a plurality of wind flow characteristics at a target location; applying a function which defines a relationship between a performance parameter, a fatigue life estimation, the combination of physical and control parameters and the plurality of wind flow characteristics, to at least some of the plurality of combinations in the database to determine values of the performance parameter and the fatigue life estimation for those combinations; and selecting one of the combinations of physical and control parameters (Continued)

as the configuration of the wind turbine for the target location on the basis of the performance parameter and fatigue life estimation values.

26 Claims, 8 Drawing Sheets

(51) Int. Cl.
  *F03D 80/00* (2016.01)
  *F03D 7/04* (2006.01)
(52) U.S. Cl.
  CPC ....... *F05B 2260/84* (2013.01); *F05B 2270/20* (2013.01); *F05B 2270/332* (2013.01); *F05B 2270/802* (2013.01); *Y02E 10/723* (2013.01)

(56) References Cited

U.S. PATENT DOCUMENTS

| | | | | |
|---|---|---|---|---|
| 10,100,813 | B2* | 10/2018 | Ravindra | ................ F03D 7/048 |
| 10,260,481 | B2* | 4/2019 | Wilson | ................... F03D 17/00 |
| 2009/0099702 | A1* | 4/2009 | Vyas | ..................... F03D 7/0292 |
| | | | | 700/287 |
| 2010/0138201 | A1 | 6/2010 | Gundling | |

FOREIGN PATENT DOCUMENTS

| | | |
|---|---|---|
| EP | 2128441 A2 | 12/2009 |
| WO | 2007045940 A1 | 4/2007 |

OTHER PUBLICATIONS

State Intellectual PRoperty Office (SIP0) of The People's Republic of China for Application No. 201580070771.1 dated Apr. 30, 2019.
Serrano Gonalez J., et al: "Overall design optimization of wind farms", Renewable Energy, Pergamon Press, Oxford, GB, vol. 36, No. 7, Oct. 7, 2010 (Oct. 7, 2010), pp. 1973-1982.
Christopher N. Elkinton, et al: Offshore Wind Farm Layout Optimization (OWFLO) Project: Preliminary Results, Proceedings Windpower 2006 Conference and Exhibition, Pittsburgh, PA, Jun. 1, 2006 (Jun. 1, 2006).
International Search Report for PCT/DK2015/050361, dated Feb. 3, 2016.
Danish Search Report for PA 2014 70731, dated Jun. 24, 2015.

* cited by examiner

DETERMINATION OF WIND TURBINE CONFIGURATION

This invention relates to computer systems and methods for determining a wind turbine configuration and in particular to methods for determining a wind turbine configuration for a target location on the basis of performance parameter and fatigue life estimation values. The invention also relates to a method and apparatus for manufacturing a wind turbine blade.

The rated power of a wind turbine is defined in IEC 61400 as the maximum continuous electrical power output which a wind turbine is designed to achieve under normal operating and external conditions. Large commercial wind turbines are generally designed for a lifetime of 20 years and their rated power output takes into account that lifespan. Rated power can only be achieved when the wind speed is high enough to support full-load operation.

In addition to being categorised by their rated power output, wind turbines are also categorised by the wind regimes for which they are designed. The various wind regimes are classified in IEC 61400 according to average annual wind speed, turbulence intensity and extreme 50-year gusts at a particular site. The IEC standard defines three classes of wind conditions under which a wind turbine might reasonably be expected to operate. These are denoted I, II and III, with Class I defining the most windy and Class III defining the least windy. Within those classes, three ranges of turbulence are defined. They are denoted A, B and C, corresponding to high medium and low turbulence, respectively.

Typically, a wind turbine design is based on an expected aggregate of conditions over the 20 year life of the turbine for a stated IEC wind class. To be considered suitable for a given wind class, a wind turbine must be designed to withstand the mechanical ultimate, or extreme, loads and mechanical fatigue loads resulting from operation under such wind conditions. Due to cost considerations and manufacturing efficiency, wind turbines are generally produced in a limited number of variants, or wind turbine types, each of which is designed specifically for a given wind class. These variants typically have a common nacelle, including gearbox and generator, for example rated at 2 MW, and have substantially different rotor diameters, for example 80 m, 90 m, 100 m. Alternatively they may have a common rotor, and gearboxes and generators with substantially different power ratings. In either case, a set of variants can be achieved while keeping the majority of turbine components as standard.

When selecting a wind turbine type for a given site, typically the wind conditions at that site are determined and translated into an IEC wind class and the most appropriate wind turbine type is selected based on these factors.

However, individual turbines may experience different wind and operating conditions over their lifetime, for example due to the topography of the site, and to variations in the conditions at the particular micro-site at which the turbine is located, leading to variations in power production, as well as component loading and fatigue life, from micro-site to micro-site for turbines of a given type and having the same configuration. As a result, some turbines may have lower levels of annual energy production (AEP), lower levels of loading and may have an actual lifetime of longer than 20 years. Such excess lifetime indicates that the turbines may be under-utilised during their lifetimes.

As used herein, the term "micro-site" refers to the specific location of an individual wind turbine, whereas the term "site" refers to a more general location, such as the location of a wind farm.

As used herein, the term "configuration" includes but is not limited to any or all of blade rotor diameter, blade length, hub height, high stop wind speed, low cut-in wind-speed, low stop wind-speed, thrust limiting controls which reduce rotor thrust at the 'knee' of the power curve at the expense of power output, gurney flaps, vortex generators and winglets. It further includes power over-rating, achieved by transiently over-rating rotational speed, drive-train torque or both. It further includes power de-rating, achieved by transiently de-rating rotational speed, drive-train torque or both. It further includes 'wind sector management' which is load limiting controls which are a function of wind-direction, where wind-direction is measured either locally at the turbine or by a power plant controller, and where the load limiting is carried out via power de-rating. As used herein, the term "knee" refers to the region of the power curve at the transition from part load to full load. This is generally the region of the power curve immediately to the left of the flat, full load part of the curve.

According to the present invention, there is provided a method for determining a configuration of a wind turbine of a given wind turbine type, the method comprising the steps of: storing in a database a plurality of combinations of physical and control parameters of the wind turbine that can be varied; determining a plurality of wind flow characteristics at a target location; applying a function which defines a relationship between a performance parameter, a fatigue life estimation, the combination of physical and control parameters and the plurality of wind flow characteristics, to at least some of the plurality of combinations in the database to determine values of the performance parameter and the fatigue life estimation for those combinations; and selecting one of the combinations of physical and control parameters as the configuration of the wind turbine for the target location on the basis of the performance parameter and fatigue life estimation values.

The invention also provides a computer system for determining a configuration of a wind turbine of a given wind turbine type, the computer system comprising: a computer processor; a memory comprising a database on which are stored a plurality of combinations of physical and control parameters of the wind turbine that can be varied, the memory further comprising a program that, when executed on the computer processor, performs an operation for processing data comprising: determining a plurality of wind flow characteristics at a target location; applying a function which defines a relationship between a performance parameter, a fatigue life estimation, the combination of physical and control parameters and the plurality of wind flow characteristics, to at least some of the plurality of combinations in the database to determine values of the performance parameter and the fatigue life estimation for those combinations; and selecting one of the combinations of physical and control parameters as the configuration of the wind turbine for the target location on the basis of the performance parameter and fatigue life estimation values.

Embodiments of the invention advantageously enable the configuration of a particular wind turbine type to be optimised for a specific micro-site to maximise turbine performance while taking into account the fatigue life of the turbine. Thus, a turbine of a given type can be configured to work closer to its peak performance in any environment and give a lower Levelised Cost of Energy. For example, where the performance parameter is power output, embodiments of the invention allow the determination of the highest power output for a turbine type for which the fatigue life estimation does not fall below a predetermined threshold. As used herein, the term "Levelised Cost of Energy" refers to a measure of the cost of energy from a turbine that is calculated by dividing the lifetime costs of the turbine by the lifetime energy output of the turbine.

The plurality of wind flow characteristics may comprise at least two of: wind speed probability density distribution; wind direction; probability density distribution; average turbulence intensity; probability density distribution of turbulence intensity; air density; probability density distribution of air density; extreme wind; average vertical wind shear; probability density distribution of vertical wind shear; average horizontal wind shear; probability density distribution of horizontal wind shear; flow inclination; wake effects; for the target location or for one or more of a discrete number of wind-direction sectors at the target location. Preferably, the plurality of wind flow characteristics is determined for at least 12 wind-direction sectors at the target location.

In certain embodiments, the method further comprises the step of determining the environmental conditions at the target location and the function defines a relationship between the performance parameter, the fatigue life estimation, the plurality of wind flow characteristics and the environmental conditions. The step of determining the environmental conditions at the target location may comprise determining at least one of: mean annual ambient temperature, probability density distribution of ambient temperature, mean annual atmospheric pressure, and probability density distribution of atmospheric pressure for the target location or for one or more of a discrete number of wind-direction sectors at the target location. Preferably, at least one of the environment conditions is determined for at least 12 wind-direction sectors at the target location.

The performance parameter may comprise at least one of: annual energy production; cost of energy; blade cost; tower and foundation cost; turbine cost; turbine lifetime operating cost and profitability.

In certain embodiments, the fatigue life estimation comprises a calculation of fatigue loading for one or more components of the wind turbine. The physical parameters may comprise any aspect of the physical configuration of the wind turbine. Preferably, the physical parameters comprise at least one of: hub height; and rotor diameter. A plurality of rotor diameters for the wind turbine may be stored in the database, each differing by less than a predetermined interval. In certain embodiments, the predetermined interval is about 10%, preferably about 5%, more preferably about 2%.

The control parameters preferably comprise at least one of: over-rating control; de-rating control; thrust limiter; high stop wind; noise control modes; low cut-in wind-speed; and low stop wind-speed; for the target location or for one or more of a discrete number of wind-direction sectors at the target location. Preferably, the control parameters comprise at least one of: over-rating control; de-rating control; thrust limiter; high stop wind; noise control modes; low cut-in wind-speed; and low stop wind-speed; for at least 12 wind-direction sectors at the target location.

The step of selecting one of the combinations may comprise ranking the combinations of physical and control parameters according to their performance parameter values and discounting any combinations with fatigue life estimations below a threshold value of fatigue life.

In certain embodiments, the step of applying the function further comprises using one or more design constraints as inputs and applying the function such that the one or more design constraints are not exceeded. Preferably, the one or more design constraints comprise one or more of: maximum hub height; minimum hub height; maximum blade length; minimum blade length; minimum power demand; maximum power demand; maximum ultimate mechanical loading of one or more components of the wind turbine; maximum fatigue loading of one or more components of the wind turbine; and maximum electrical loading of one or more components of the wind turbine.

Features described in relation to the first aspect of the invention may also be applicable to the second aspect of the invention.

Embodiments of the invention will now be described, by way of example only, and with reference to the accompanying drawings, in which.

The following description addresses the general configuration of wind turbines, the output power from those turbines, and the determination of a wind turbine configuration based on the wind characteristics of a specific turbine micro-site.

Figure 1:
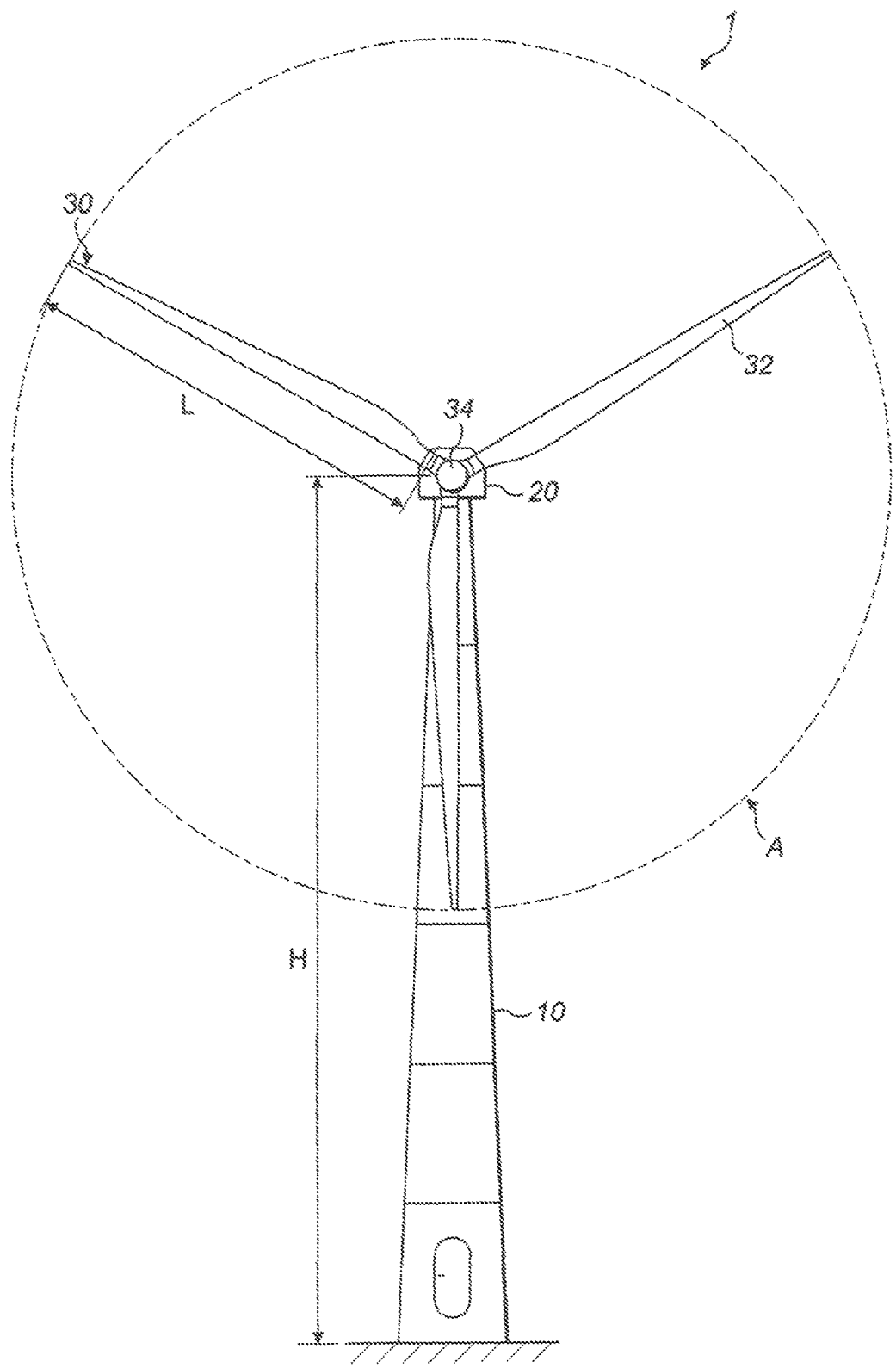
FIG. 1 is a schematic front view of a conventional wind turbine.

FIG. 1 illustrates a large conventional wind turbine 1, as known in the art, comprising a tower 10 and a wind turbine nacelle 20 positioned on top of the tower 10. In this embodiment, the wind turbine rotor 30 comprises three wind turbine blades 32 each having a length L. In other embodiments, the wind turbine rotor 30 could comprise another number of blades 32, such as one, two, four, five, or more. The blades 32 are mounted on a hub 34 which is located at a height H above the base of the tower. The hub 34 is connected to the nacelle 20 through a low speed shaft (not shown) extending from the front of the nacelle 20. The low speed shaft drives a gearbox (not shown) which steps up the rotational speed and, in turn, drives an electrical generator within the nacelle 20 for converting the energy extracted from the wind by the rotating blades 32 into electrical power output. The wind turbine blades 32 define a swept area A, which is the area of a circle delineated by the rotating blades 32. The swept area dictates how much of a given air mass is intercepted by the wind turbine 1 and, thus, influences the power output of the wind turbine 1 and the forces and bending moments experienced by the components of the turbine 1 during operation. The turbine may stand onshore, as illustrated, or offshore. In the latter case the tower will be connected to a monopile, tripod, lattice or other foundation structure, and the foundation could be either fixed or floating.

Figure 2:
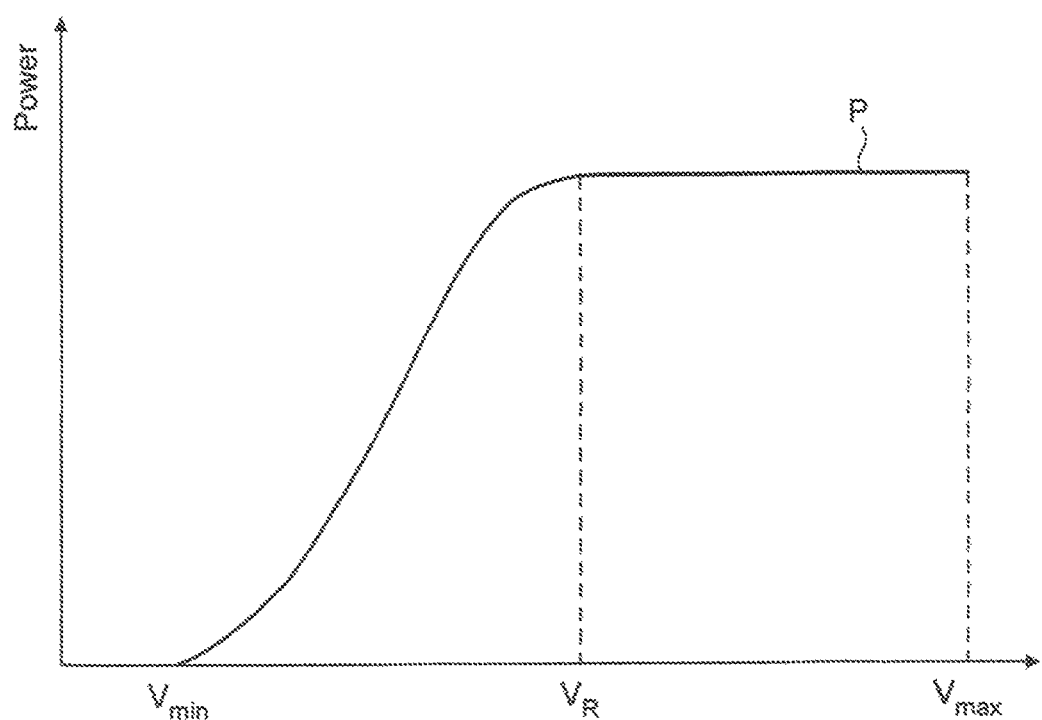
FIG. 2 is a graph of wind speed against power showing a power curve for a conventional wind turbine.

FIG. 2 illustrates a conventional power curve of a wind turbine for steady wind conditions, in which wind speed is plotted on the x axis against power output on the y axis. Curve P is the normal power curve for the wind turbine and defines the power output by the wind turbine generator as a function of wind speed. As is well known in the art, the wind turbine starts to generate power at a cut in wind speed $V_{min}$. The turbine then operates under part load (also known as partial load) conditions until the rated wind speed is reached at point $V_R$. At the rated wind speed at point $V_R$ the rated (or nominal) generator power is reached and the turbine is operating under full load. The cut in wind speed in a typical wind turbine is 3 m/s and the rated wind speed is 12 m/s. Point $V_{max}$ is the cut out wind speed, or "high stop wind speed", which is the highest wind speed at which the wind turbine may be operated while delivering power. At wind speeds equal to and above the cut out wind speed the wind turbine is shut down for safety reasons, in particular to reduce the loads acting on the wind turbine.

However, wind is not steady and the power output of a wind turbine in variable conditions can vary significantly from the steady wind power curve shown in FIG. 2.

Figure 3A:
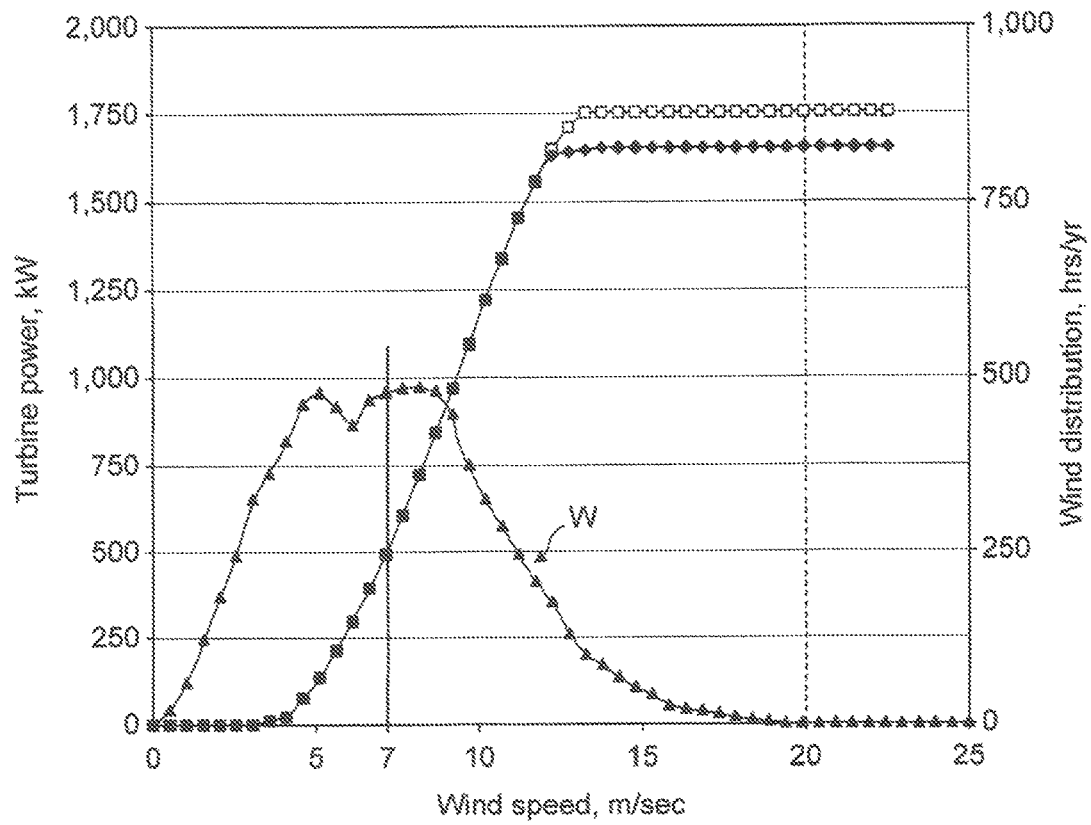
FIGS. 3A and 3B illustrate wind distribution curves of a typical wind turbine site.
Figure 3B:
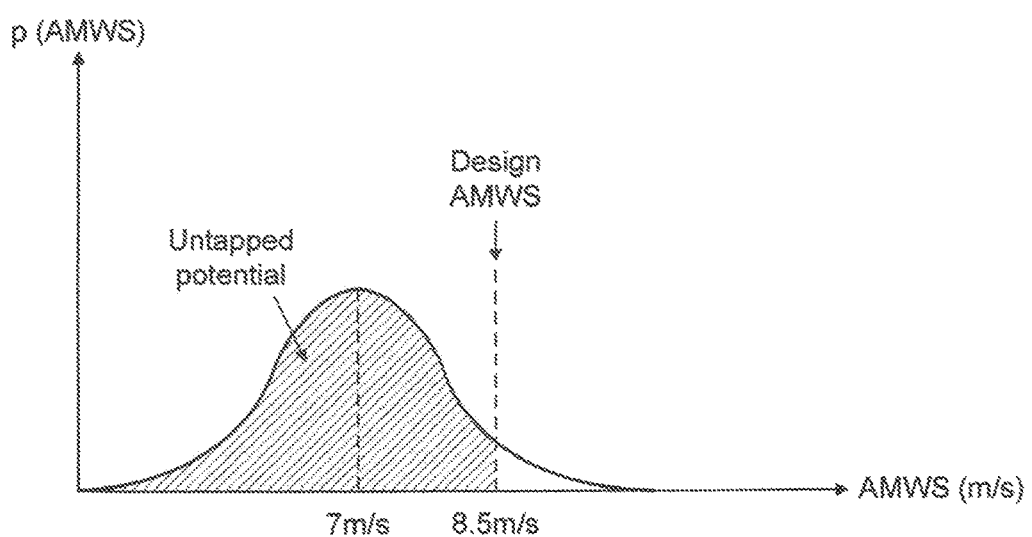

FIG. 3A illustrates a wind distribution curve W of a typical wind turbine micro-site. This indicates the probability density distribution of the wind speed in hours per year. Put simply, this is the distribution of the proportion of time spent by the wind within narrow bands of wind speed. As can be seen, the overall mean wind speed is 7 m/s, although many of the most commonly occurring wind speeds are less than this. Thus, the wind turbine will spend a significant proportion of time operating below its rated power. The probability density distribution of the wind speed will vary from site to site and, on a wind farm, may vary among specific turbine micro-sites, for example due to the terrain and/or the influence of adjacent turbines on wind flow. An example of this is given in FIG. 3B, in which the probability density function of Annual Mean Wind-Speed (AMWS) is plotted for a fleet of over 2000 modern multi-MW turbines. Such variations in wind distribution among micro-sites which otherwise appear to be broadly similar result in variations in the load magnitude and cycles experienced by wind turbines operated at those locations and the annual energy production (AEP) of those turbines. The resulting untapped potential, in terms of underused fatigue capability, is indicated by the shaded region in FIG. 3B. Similar distributions to that of FIG. 3B are seen for turbulence intensity and other wind characteristics that affect turbine loads.

Other environmental conditions at a particular micro-site can also influence the AEP of a given wind turbine and the loads experienced. This is due to the fact that the kinetic energy of the wind from which the turbine produces power is proportional to the density of the air. For example, variations in the distribution of air density due to variations in ambient temperature and atmospheric pressure at different wind turbine locations result in variations in the distribution of kinetic energy of the wind and, thus, the AEP and loading of a particular wind turbine type, from turbine micro-site to turbine micro-site. These variations can lead to significant differences in the performance and fatigue life of a wind turbine over the course of its 20 year design lifetime in comparison to the same wind turbine type sited elsewhere.

In addition to differences in wind speed probability density distribution and the environmental conditions mentioned above, turbulence intensity may also vary from micro-site to micro-site, for example due to variable atmospheric stability, unsteady wind, variations in the terrain and turbulence from the wakes of adjacent turbines. As turbulence can cause fluctuations in the power generation of individual turbines, variations in turbulence intensity will also impact upon the performance and loading of that turbine. Further, the relationship between turbulence intensity and fatigue life is non-linear: a modest increase in turbulence intensity can imply a significant reduction in the fatigue life of certain wind turbine components. Thus, turbulence intensity at a specific micro-site can be an important factor in determining the lifetime of a turbine at that location.

Figure 4A:
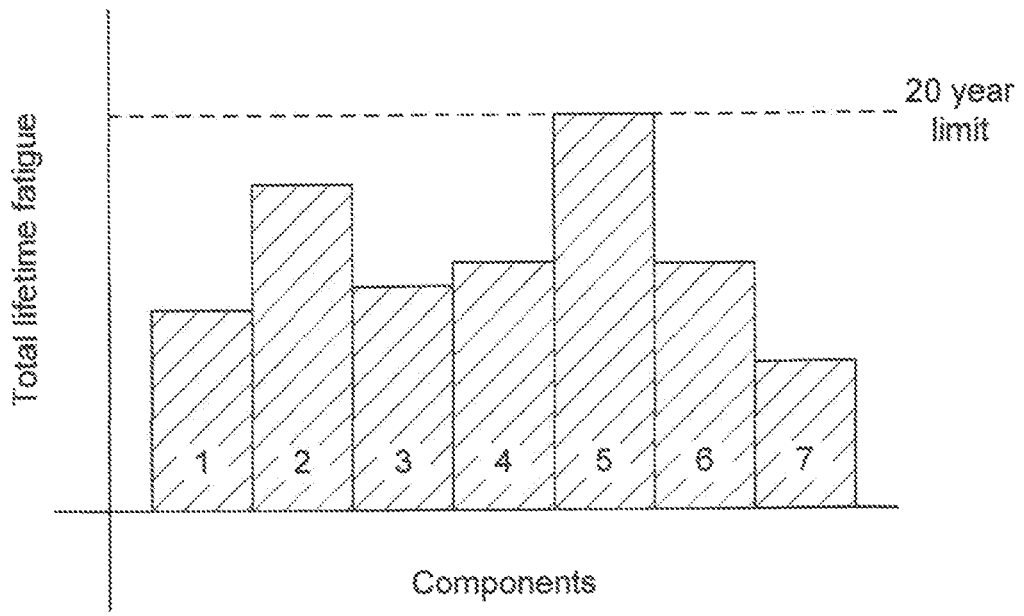
FIGS. 4A and 4B show the total lifetime fatigue of various wind turbine components at two different turbine micro-sites.
Figure 4B:
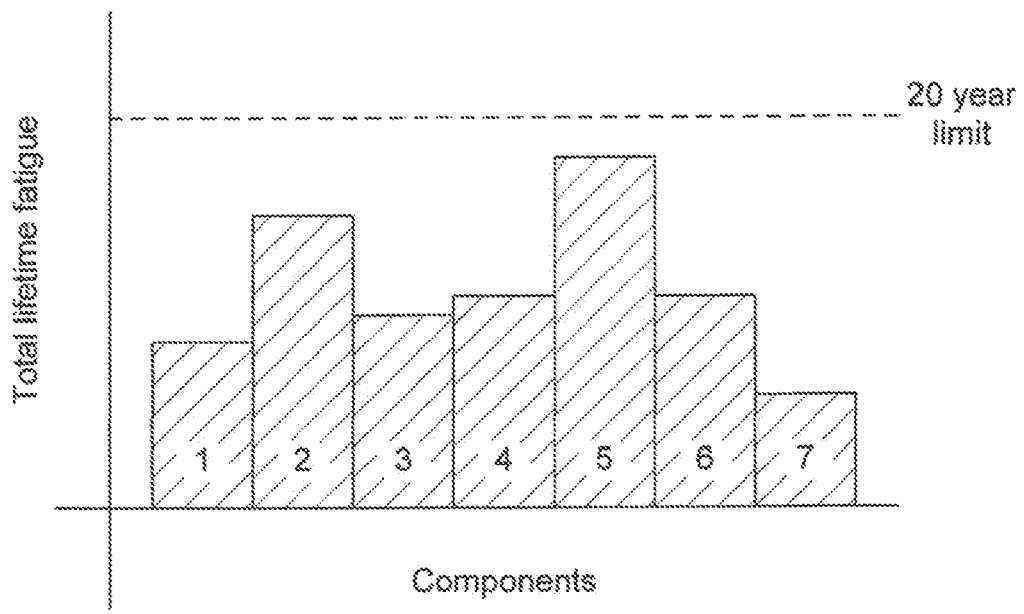

FIG. 4A and 4B show the total lifetime fatigue of various wind turbine components at two different micro-sites. As turbine components fatigue at different rates in different conditions, the actual lifetime of some components may be considerably more than the 20 year expected lifetime for a wind turbine. As shown in FIG. 4A, component 5 is the most critical, defining the overall 20 year life of the wind turbine. As shown in FIG. 4B, the operating conditions at that particular micro-site are such that none of the components are at their aggregate lifetime limit after 20 years. Even component 5, which is driving the overall turbine life, has spare lifetime capacity and is unlikely to fail until well after the end of the 20 year lifetime of the turbine. Thus, a wind turbine under these operating conditions can be considered to have spare power production capacity and is being under-utilised, since the fatigue life of each key component is not being consumed at the rate for which it has been designed. This is illustrated further in FIG. 5.

Figure 5:
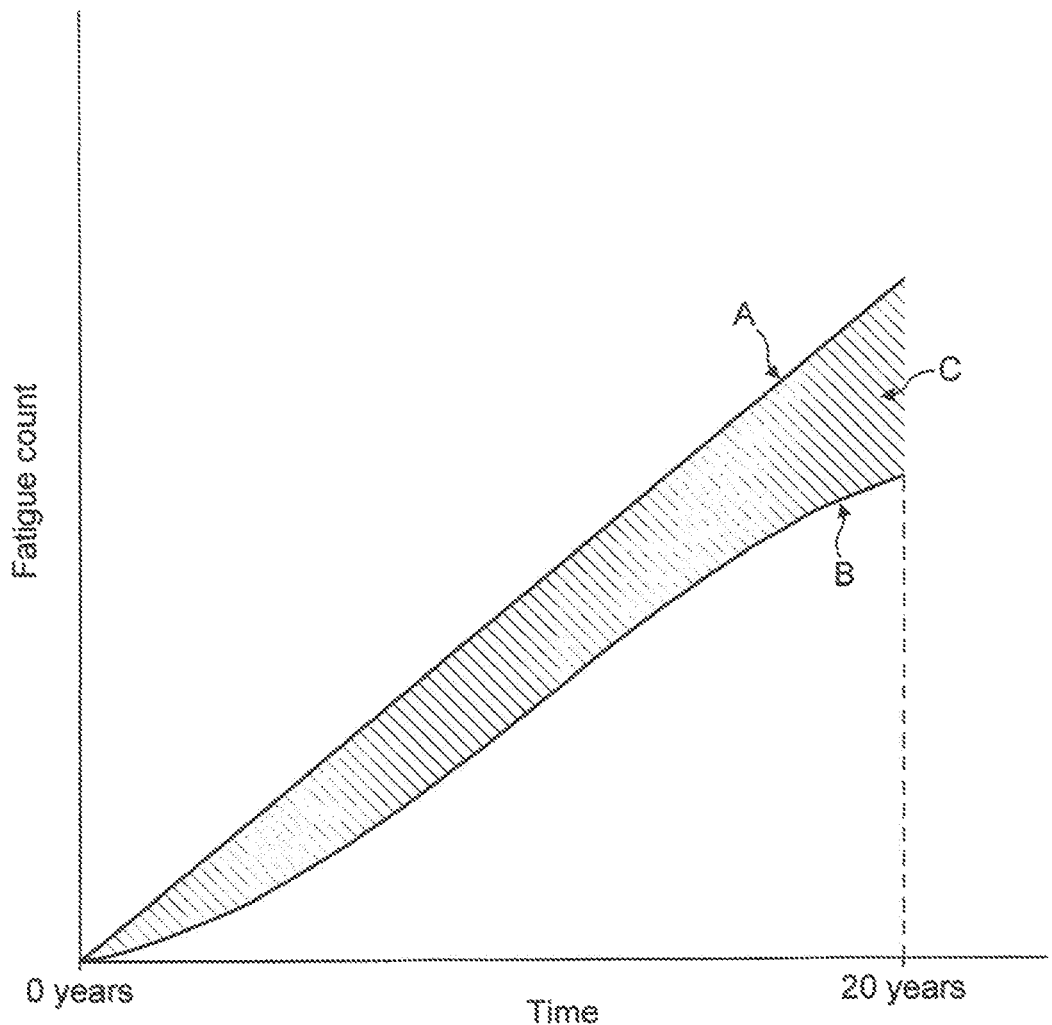
FIG. 5 is a graph illustrating an example relationship of the accumulated fatigue life of a main component of a wind turbine against time.

FIG. 5 is a graph illustrating an example relationship of the accumulated fatigue life of a main component of a wind turbine with time. Line A shows the design fatigue count and line B shows the estimated actual fatigue count of the component. As can be seen, the rate at which fatigue life of the component is consumed is less than the rate for which it was designed, as shown by line A. The difference between design and actual fatigue count at any one point, illustrated by area C, represents the under utilisation of that component. Where the component is a key component which defines overall turbine life, area C and the difference between lines A and B after 20 years, represent an amount by which the turbine itself can be considered to have been under utilised.

Figure 6:
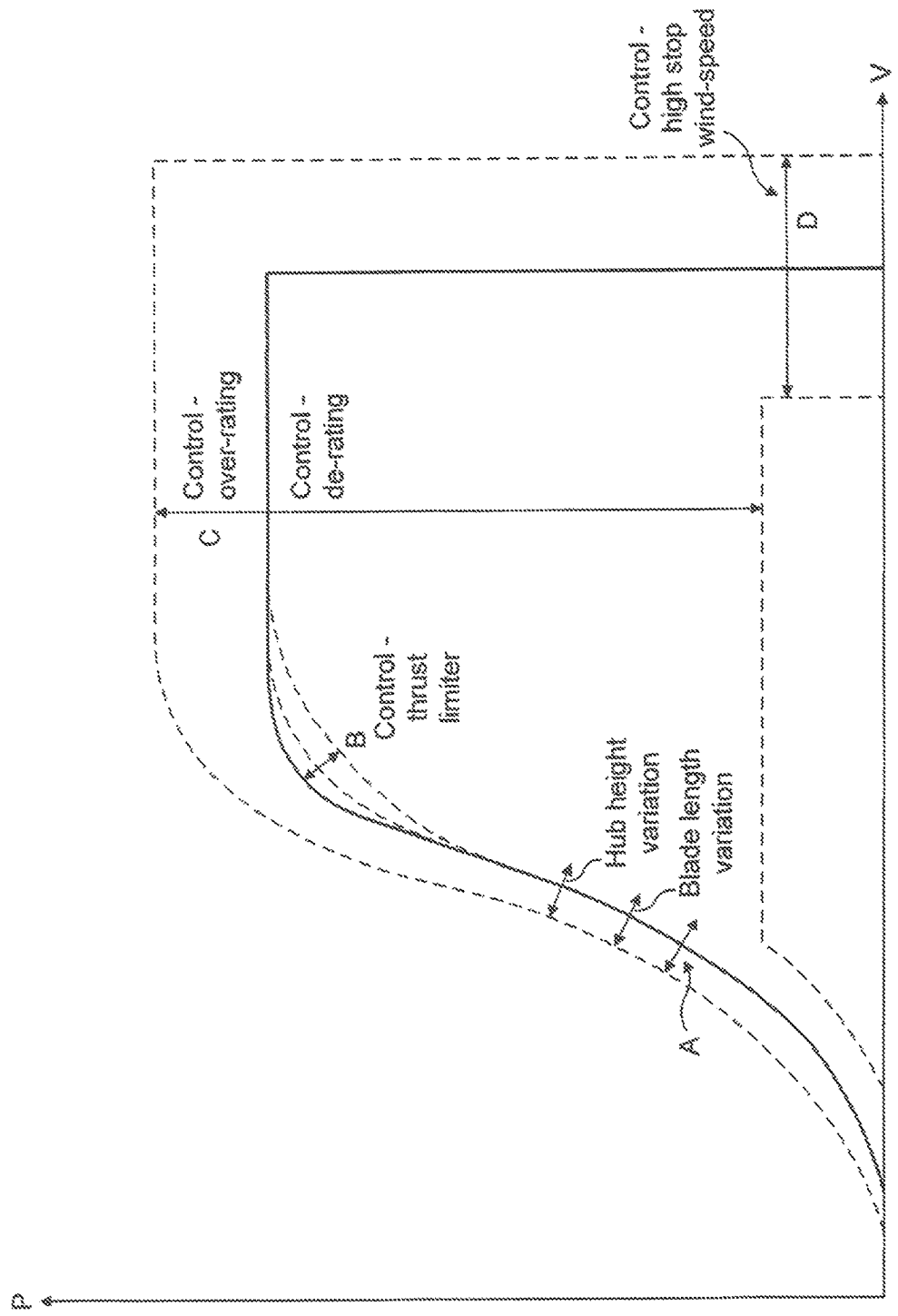
FIG. 6 illustrates a power curve envelope for a wind turbine configured according to the invention.

FIG. 6 illustrates a power curve envelope for a wind turbine which is be achievable by adjusting certain physical parameters or wind turbine control parameters. As illustrated by arrows A-D, and as discussed below, various levers exist for adjusting the power curve within the power curve envelope.

Arrow A illustrates the variation in a power output curve which is possible below part-load operation and during part-load operation by adjusting the height of the hub and/or by adjusting the length of the rotor blades of the wind turbine to increase the rotor diameter and swept area of the turbine. In general, increasing the height of the hub results in an increase in the annual mean wind speed (AMWS) experienced at the hub. As wind energy increases as a function of the cube of the wind speed, increasing the height of the hub will increase the energy of the wind incident on the turbine rotor and, thus, will generally result in an increase in the power output of the wind turbine at any given micro-site. It will also tend to result in an increase in the loads acting on the turbine. Conversely, reducing the hub height will generally reduce the AMWS and, consequently, the power output of the wind turbine and the loads which act on it. Increasing the length of the rotor blades increases the swept area of the wind turbine which, in turn, increases the amount of wind energy extracted by the rotor blades from a given air mass. Since the swept area is a function of the square of the blade length small increases in blade length can result in significant increases in swept area, with corresponding increases in power generation. It should be noted that the relationship between blade length and loads is also non-linear. Thus, the fatigue life of certain turbine components, and the overall turbine life, may be significantly diminished by an increase in blade length. Conversely, reducing the length of the turbine blades will generally result in a non-linear decrease in the power output of the turbine and the loads experienced by its components.

In addition to varying the power output and loading of the wind turbine below and during part-load operation, adjusting the hub height H and/or the blade length L will also vary the loads acting on a wind turbine during full load operation.

Arrow B illustrates the variation in power output which is possible at the transition between part load and full load operation through control of the thrust force using a thrust limiting control action. Thrust is the axial force on the wind turbine rotor and increases as a function of the wind speed, the air density and the pitch angle of the rotor blades An example of a thrust limiting control action for a variable pitch wind turbine is as follows. The rotor thrust is estimated from signals that are available to the control system, such as the generator power, wind-speed and rotational speed. If the rotor thrust reaches a given level, a positive offset is applied to the pitch demand. This means that the blades are pitched slightly out of the wind and has the effect of reducing the thrust. However a negative side-effect is that the power output is also reduced. Across the range of operating wind-speeds, the thrust is highest in the region just below rated wind-speed, marked B in FIG. 6, and therefore this is where the power curve is reduced by the action of a thrust limiting control action.

Arrow C illustrates the variation in power output which is possible during full load operation by adjusting the control parameters of the wind turbine, for example by adjusting the power demand either using control functionality within the turbine's controller or within the power plant controller. An example of the latter is the wind sector management settings. During full load operation, the wind turbine can be operated at rated power, or it can be de-rated or over-rated by the controller. The term "de-rating" is understood to mean producing less than the rated active power during full load operation. When the turbine is de-rated, it is run less aggressively than normal and the generator has a power output which is lower than the rated power for a given wind speed. The "de-rating" may be via reduced rotational speed, reduced drive-train torque or a combination of both. The term "over-rating" is understood to mean producing more than the rated active power during full load operation. Similarly, the "over-rating" may be via increased rotational speed, increased drive-train torque or a combination of both. When the turbine is over-rated, it is run more aggressively than normal and the generator has a power output which is higher than the rated power for a given wind speed. The over-rating and de-rating are characterised by a transient behaviour. When a turbine is over-rated it may be for as short as a few seconds, or for an extended period of time if the wind conditions and the fatigue life of the components are favourable to over-rating. The over-rating power level may be up to 30% above the rated power output. When a turbine is de-rated it may be for as short as a few seconds, or for an extended period of time if the output of the wind power plant is curtailed by the grid operator, or if the wind conditions and the fatigue life of the components are not favourable to operating at rated power. The de-rating power level may be down to 0% of the rated power output. Extended periods of de-rating, of weeks or months, occasionally take place in the months immediately after construction of a wind power plant if the local electricity grid requires reinforcement but the turbines are commissioned before the reinforcement has been completed.

Although arrow C illustrates the variation in power output which is possible during full load operation, the power output and loading of the turbine can be altered at all wind speeds by adjusting the control parameters of the wind turbine. For example, the turbine can be de-rated during part-load operation.

When operating as part of a wind power plant, the over-rating of a specific turbine may be carried out in response to an over-rating signal sent to the wind turbine from a central power plant controller (PPC). For example, the PPC receives a signal which is a measure of the difference between the total power plant output and the nominal power plant output, i.e. the sum of the rated outputs of each of the individual turbines. This difference is used as an input to an integrator and subsequently to an amplifier to provide an over-rating amount to the PPC. This over-rating amount is sent as an over-rating request signal by the PPC to each of the turbines. In theory, only a single turbine may be over-rated, but it is preferred to over-rate a plurality of the turbines, and most preferred to send the over-rating signal to all the turbines. The over-rating signal sent to each turbine is not a fixed control but an indication of a maximum amount of over-rating that each turbine may perform. Typically, each turbine has an individual controller, which may be located at the turbine or centrally, which will determine whether the turbine can respond to the over-rating signal and, if so, by what amount. Thus, each turbine responds individually to the over-rating signal in accordance with its controller.

How the turbine responds to an over-rating or a de-rating signal is largely determined by the control parameters programmed into the turbine controller. For example, the over-rating or de-rating response of a given wind turbine may be adjusted by pre-programming into the individual turbine controller maximum or minimum power output limits or, more preferably, torque or speed limits permitted during de-rating and over-rating. Thus, the amount by which the power output and loading of the wind turbine can be decreased, or increased, during full load operation can be altered by changing the turbine control parameters.

As mentioned above, power output and loading during full load operation can also be varied by changing the hub height H and/or the rotor blade length L.

Arrow D illustrates the variation in power which is possible by increasing or decreasing the high stop wind speed, i.e. the wind speed at which power generation and rotation of the wind turbine is prevented to avoid damage or excessive wear caused by high winds. Increasing the high stop wind speed can result in significant increases in the AEP of a turbine where conditions permit. It can also result in a significant increase in the loads acting on the turbine and the loading of its components. Thus, increasing the high stop wind is generally more suitable at micro-sites where the turbulence intensity of the wind is low.

The potential power output envelope and arrows A-D shown in FIG. 6 illustrate that the power output, and thus AEP, of a wind turbine can be altered below part load operation, in part load operation and in full load operation, as well as above the usual upper cut out speed, by changing certain physical parameters and control parameters of the wind turbine. Each of the parameter changes described above can have quite different effects on the load regime of the turbine and, therefore, the fatigue life of the main turbine components.

Figure 7:
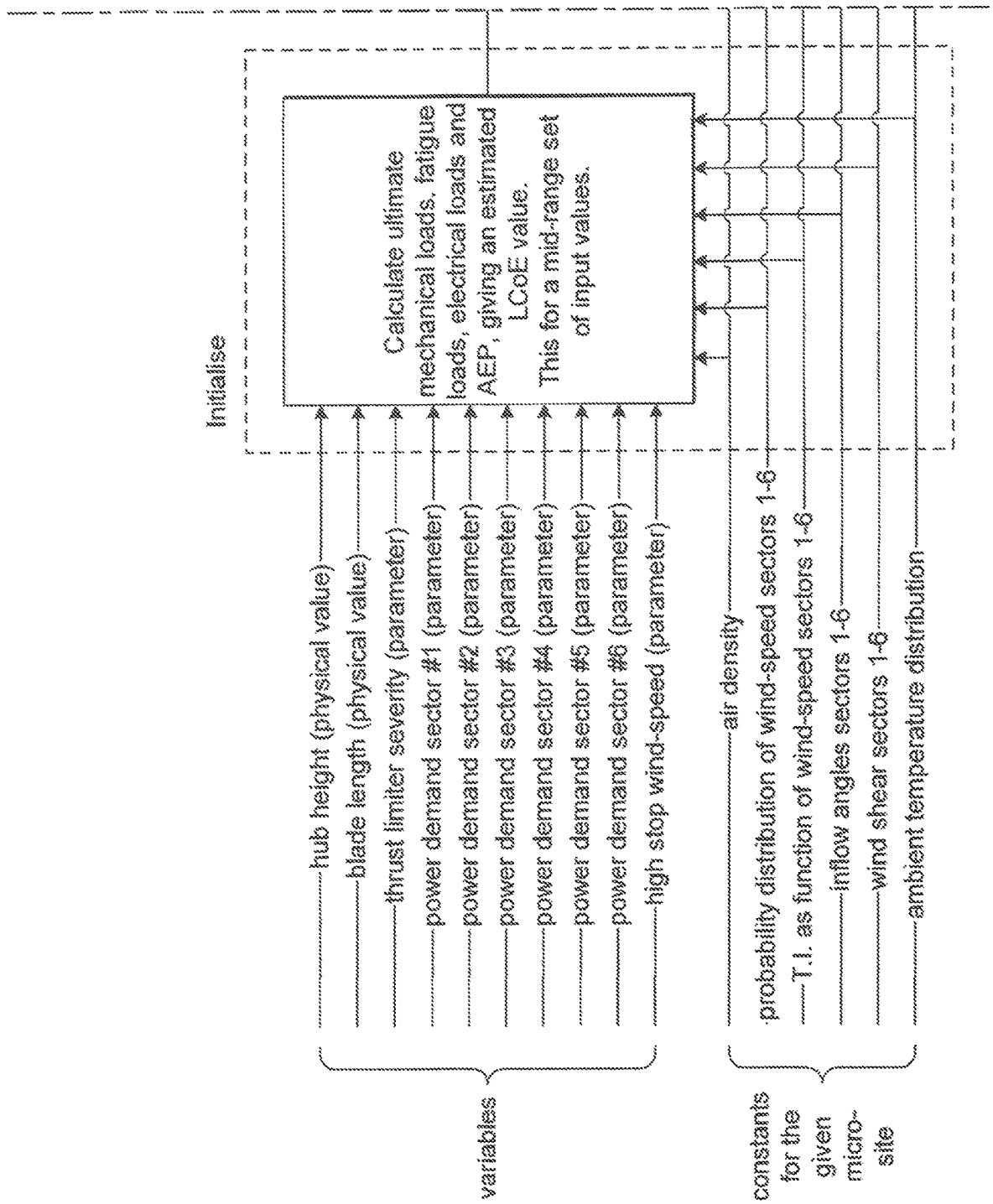
FIG. 7 is a flowchart illustrating a method of configuring a wind turbine for a given micro-site in accordance with the present invention.
Figure 7:
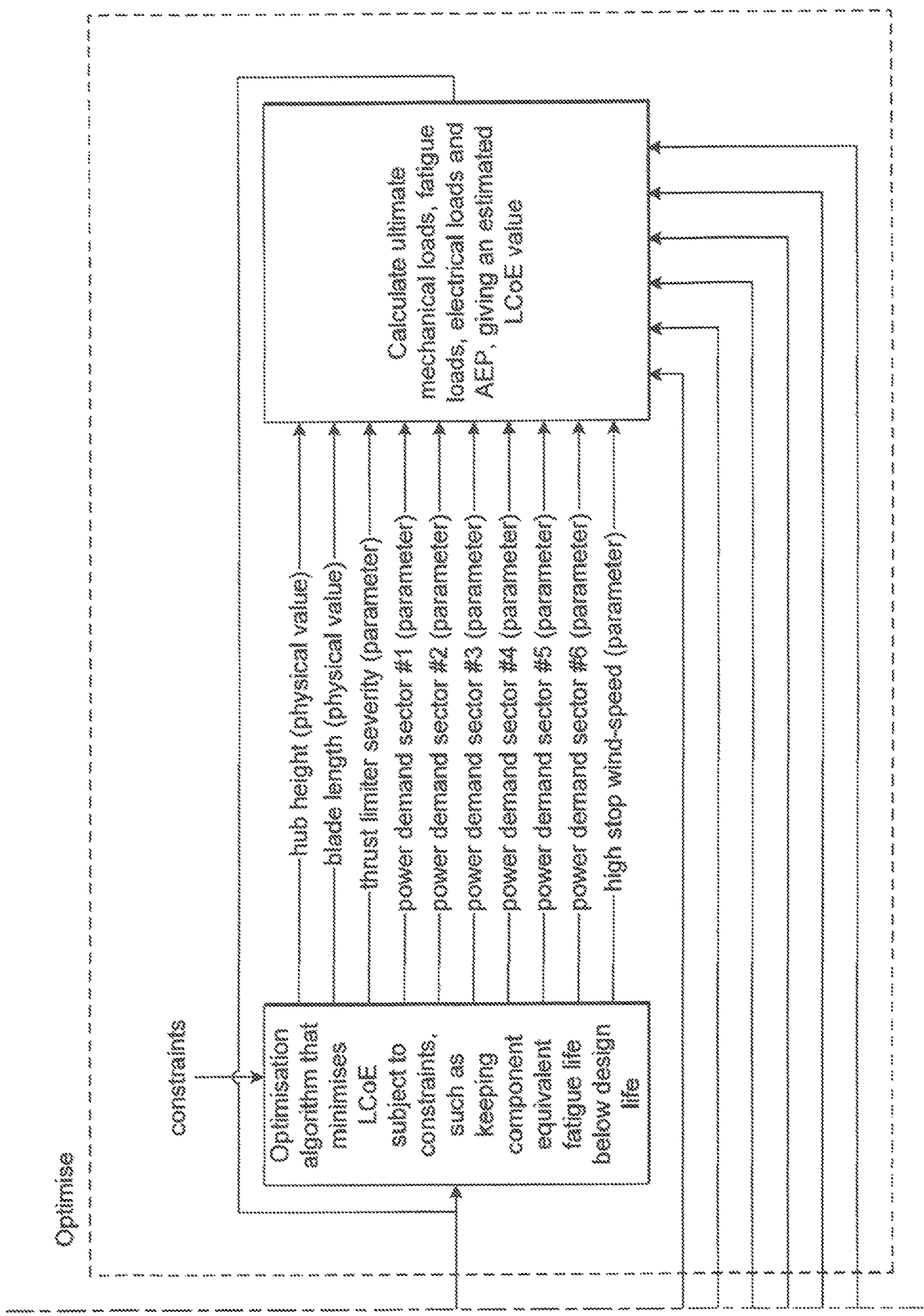

FIG. 7 is a flowchart illustrating a method of configuring a wind turbine for a given micro-site in accordance with the present invention.

Referring to FIG. 7, the optimisation procedure requires the determination of a number of constants for a given micro-site and calculating an initial condition for the optimisation using the mid-range values of a number of physical and control parameters. Once the initial condition has been calculated, the optimisation process applies a function defining a relationship between levelised cost of energy and input values for the physical and control parameters to determine the combination of input values that minimises the levelised cost of energy without exceeding certain optimisation constraints.

For the calculation of the initial condition for the optimisation, the following constants for a given micro-site are ascertained: (a) air density of the micro-site; (b) probability density distribution of wind-speed at the micro-site, for a number of wind-direction sectors, for example 6; (c) turbulence intensity (T.I.) as a function of wind-speed at the micro-site, for the chosen number of wind-direction sectors; (d) inflow angles for the chosen wind-direction sectors at the micro-site; (e) wind shear for each of the chosen wind-direction sectors at the micro-site; (f) any other key parameters which describe the climatic conditions and are known to have a powerful influence on the given turbine design's loading and/or Annual Energy Production (AEP).

The above constants are then used along with the following physical and control parameter values to calculate the initial condition for the optimisation,: (i) mid-range hub height; (ii) mid-range blade length; (iii) no thrust-limiting control action; (iv) no over-rating; (v) no de-rating; (vi) mid-range high stop wind control.

From the initial condition, the optimisation process uses the inputs and constraints listed below to minimise the levelised cost of energy (LCoE), either by calculating the LCoE directly or by calculating certain LCoE variables. In this optimisation, the LCoE variables are AEP, the effect of changes in blade length on turbine cost and the effect of changes in hub height on turbine cost. The actual value of LCoE itself does not need to be calculated, but only the variable components that are functions of AEP, blade length and hub height. These three components need to be weighted appropriately relative to one another. The optimisation is run until the LCoE is minimised, for example until the change in the calculated LCoE from step to step is within a given tolerance.

Optimisation Inputs
1. Hub height, a value from a set of discrete values, typically 4 values
2. Blade length, a value from a set of discrete values, typically 4 values
3. Control parameter defining the severity of the thrust limiter
4. Power Demand (allows Over-Rating or De-Rating) for direction sector #1
5. Power Demand (allows Over-Rating or De-Rating) for direction sector #2
6. Power Demand (allows Over-Rating or De-Rating) for direction sector #3
7. Power Demand (allows Over-Rating or De-Rating) for direction sector #4
8. Power Demand (allows Over-Rating or De-Rating) for direction sector #5
9. Power Demand (allows Over-Rating or De-Rating) for direction sector #6
10. High stop wind-speed control parameter Optimisation Constraints
1. Maximum hub height
2. Minimum hub height
3. Maximum blade length
4. Minimum blade length
5. Minimum power demand (typically approximately 10%-30% of nominal power)
6. Maximum power demand (typically approximately 110%-130% of nominal power)
7. Ultimate mechanical load of component #1 to not exceed design load
8. Ultimate mechanical load of component #2 to not exceed design load
9. Fatigue load of component #1 to not exceed design load
10. Fatigue load of component #2 to not exceed design load
11. Electrical load of component #1 to not exceed design load
12. Electrical load of component #2 to not exceed design load Although only one thrust limiter control parameter is shown above, more than one thrust limiter control parameter may be used as an optimisation inputs, depending on the structure of the thrust limiter algorithm. Alternatively the maximum permissible rotor thrust may be removed entirely from the optimisation inputs and applied as an optimisation constraint.

The high stop wind has been represented here and in FIG. 7 as a single value, however this could also be a shaped function to rampdown the power demand in the region around the high stop wind-speed, as is increasingly appearing in grid requirements. In such cases, the function could consist of steps down in power (speed and/or torque) or a continuous function for reducing power (speed and/or torque).

The power demand has been represented here and in FIG. 7 as one power demand for each wind-direction sector, however this could alternatively be a speed demand and/or a torque demand for each sector. The disadvantage or using both a speed demand and a torque demand is that the computing time for calculating the optimal configuration will be longer.

For simplicity, less influential control variables have omitted from the above description and from FIG. 7, however they could be included depending on the design of the turbine and the type of site on which it stands. These include: low cut-in wind-speed in each wind-direction sector; low stop wind-speed in each wind-direction sector; and noise-regulating control in each wind-direction sector, for which typically rotational speed is limited at certain wind-speeds to maintain acoustic noise emissions below a pre-defined level. This control would be represented as a constraint in the optimisation.

The calculations that are carried out for mechanical loads, both ultimate and fatigue, can be in accordance with IEC 61400-1 or similar. The AEP may be calculated using an aero-elastic simulation tool as is used for the mechanical load calculations. The electrical loads may be calculated using models of the turbine and its duty on the given micro-site. The optimisation procedure could be carried out using the ultimate load, fatigue load and electrical load for all turbine components, or for a small number of key turbine components.

The simulation determines the optimal combination of the physical and control parameters for a given wind turbine type at a given micro-site, based on the wind and environmental conditions of that micro-site, to maximise turbine performance while keeping to the specified fatigue life or typically 20 years. Where applicable, the simulation can also take into account regulatory requirements at a particular location, such as tip height restrictions, to ensure the configuration is optimised within locally allowable constraints.

As a result of the simulator outputs to determine the most efficient or cost effective simulated wind turbine configuration for a specific micro-site, a corresponding real world wind turbine may be constructed, or the appropriate parameters applied to an existing wind turbine. The simulation procedure can be applied for a number of wind turbine locations to determine the most efficient or cost effective simulated configuration of a number of wind turbines, such as a cluster of turbines within a wind power plant (WPP) or across an entire WPP. A corresponding real world cluster of wind turbines, or a WPP, may then be constructed according to the simulator outputs, or the appropriate parameters applied to an existing cluster of wind turbines or an existing WPP.

Embodiments of the invention have been described in relation to a computer system. It should be appreciated that a configurator system may be provided on a distributed or networked system in which elements are remote from the user terminal.

While embodiments of the invention have been shown and described, it will be understood that such embodiments are described by way of example only. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

The invention claimed is:

1. A method for determining a configuration of a wind turbine of a given wind turbine type, the method comprising:
storing, in a database,. a plurality of combinations of physical and control parameters of the wind turbine, wherein each combination of the plurality of combinations comprises one or more variable physical parameters and one or more variable control parameters;
determining a plurality of wind flow characteristics at a target location for the wind turbine;
determining, for each combination of the plurality of combinations, values of a performance parameter and a fatigue life estimation for the combination, wherein determining the values comprises:
applying a predefined function to the one or more variable physical parameters of the combination, the one or more variable control parameters of the combination and the plurality of wind flow characteristics; and
selecting, based on the values of the performance parameter and the fatigue life estimation determined for the plurality of combinations, one of the plurality of combinations as the configuration of the wind turbine for the target location.

2. The method according to claim 1, wherein the plurality of wind flow characteristics comprise at least two wind flow characteristics selected from the following: wind speed probability density distribution; wind direction; probability density distribution; average turbulence intensity; probability density distribution of turbulence intensity; air density; probability density distribution of air density; extreme wind; average vertical wind shear; probability density distribution of vertical wind shear;
average horizontal wind shear; probability density distribution of horizontal wind shear;
flow inclination; and wake effects,
wherein the at least two wind flow characteristics correspond to the target location or to one or more of a discrete number of wind-direction sectors at the target location.

3. The method according to claim 1, wherein the method further comprises:
determining environmental conditions at the target location,
wherein determining the values comprises:
applying the predefined function to the one or more variable physical parameters of the combination, the one or more variable control parameters of the combination, the plurality of wind flow characteristics, and the environmental conditions.

4. The method according to claim 3, wherein determining the environmental conditions at the target location comprises determining at least one environmental condition selected from the following: mean annual ambient temperature, probability density distribution of ambient temperature, mean annual atmospheric pressure, and probability density distribution of atmospheric pressure,
wherein the at least one environmental condition corresponds to the target location or to one or more of a discrete number of wind-direction sectors at the target location.

5. The method according to claim 1, wherein the performance parameter comprises at least one performance parameter selected from the following: annual energy production; cost of energy; blade cost; tower and foundation cost; turbine cost; turbine lifetime operating cost; and profitability.

6. The method according to claim 1, wherein the fatigue life estimation comprises a calculation of fatigue loading for one or more components of the wind turbine.

7. The method according to claim 1, wherein the one or more variable physical parameters comprise at least one physical parameter selected from the following: hub height; and rotor diameter.

8. The method according to claim 1, wherein storing the plurality of combinations comprises storing in the database a plurality of rotor diameters, each differing by less than a predetermined interval.

9. The method according to claim 8, wherein the predetermined interval is about 10%.

10. The method according to claim 1, wherein the one or more variable control parameters comprise at least one control parameter selected from the following: over-rating control; de-rating control; thrust limiter; high stop wind; noise control modes; low cut-in wind-speed; and low stop wind-speed,
wherein the at least one control parameter corresponds to the target location or to one or more of a discrete number of wind-direction sectors at the target location.

11. The method according to claim 1, wherein selecting one of the plurality of combinations comprises:
ranking the plurality of combinations of physical and control parameters according to the respective values of the performance parameter; and discounting any combinations of the plurality of combinations having the respective values of fatigue life estimation less than a threshold value of fatigue life.

12. The method according to claim 1, wherein applying the function comprises:
  receiving one or more design constraints as inputs; and
  ensuring that the one or more design constraints are not exceeded for the combination.

13. The method according to claim 12, wherein the one or more design constraints comprise one or more design constraints selected from the following: maximum hub height; minimum hub height; maximum blade length; minimum blade length; minimum power demand; maximum power demand; maximum ultimate mechanical loading of one or more components of the wind turbine; maximum fatigue loading of one or more components of the wind turbine; and maximum electrical loading of one or more components of the wind turbine.

14. A computer system for determining a configuration of a wind turbine of a given wind turbine type, the computer system comprising:
  a computer processor; and
  a memory comprising:
    a database storing a plurality of combinations of physical and control parameters of the wind turbine, wherein each combination of the plurality of combinations comprises one or more variable physical parameters and one or more variable control parameters; and
    a program that, when executed on the computer processor, performs an operation comprising:
      determining a plurality of wind flow characteristics at a target location for the wind turbine;
      determining, for each combination of the plurality of combinations, values of a performance parameter and a fatigue life estimation for the combination, wherein determining the values comprises:
      applying a predefined function to the one or more variable physical parameters of the combination, the one or more variable control parameters of the combination, and the plurality of wind flow characteristics; and
      selecting, based on the values of the performance parameter and the fatigue life estimation determined for the plurality of combinations, one of the plurality of combinations as the configuration of the wind turbine for the target.

15. The computer system of claim 14, wherein the plurality of wind flow characteristics comprise at least two wind flow characteristics selected from the following: wind speed probability density distribution; wind direction; probability density distribution; average turbulence intensity; probability density distribution of turbulence intensity; air density; probability density distribution of air density; extreme wind; average vertical wind shear; probability density distribution of vertical wind shear; average horizontal wind shear; probability density distribution of horizontal wind shear; flow inclination; and wake effects,
  wherein the at least two wind flow characteristics correspond to the target location or to one or more of a discrete number of wind-direction sectors at the target location.

16. The computer system according to claim 14, wherein the operation further comprises:
  determining environmental conditions at the target location,
  wherein determining the values comprises:
    applying the predefined function to the one or more variable physical parameters of the combination, the one or more variable control parameters of the combination, the plurality of wind flow characteristics, and the environmental conditions.

17. The computer system according to claim 16, wherein determining the environmental conditions at the target location comprises determining at least one environmental condition selected from the following: mean annual ambient temperature, probability density distribution of ambient temperature, mean annual atmospheric pressure, and probability density distribution of atmospheric pressure,
  wherein the at least one environmental condition corresponds to the target location or to one or more of a discrete number of wind-direction sectors at the target location.

18. The computer system according to claim 14, wherein the performance parameter comprises at least one performance parameter selected from the following: annual energy production; cost of energy; blade cost; tower and foundation cost; turbine cost; turbine lifetime operating cost; and profitability.

19. The computer system according claim 14, wherein the fatigue life estimation comprises a calculation of fatigue loading for one or more components of the wind turbine.

20. The computer system according to claim 14, wherein the one or more variable physical parameters comprise at least one physical parameter selected from the following: [[of:]] hub height; and rotor diameter.

21. The computer system according to claim 14, wherein the one or more variable physical parameters comprise a plurality of rotor diameters, each differing by less than a predetermined interval.

22. The computer system of claim 21, wherein the predetermined interval is about 10%.

23. The computer system according to claim 14, wherein the one or more variable control parameters comprise at least one control parameter selected from the following: over-rating control; de-rating control; thrust limiter; high stop wind; noise control modes; low cut-in wind-speed; and low stop wind-speed,
  wherein the at least one control parameter corresponds to the target location or to one or more of a discrete number of wind-direction sectors at the target location.

24. The computer system according to claim 14, wherein selecting one of the plurality of combinations comprises:
  ranking the plurality of combinations according to the respective values of the performance parameter; and
  discounting any combinations of the plurality of combinations having the respective values of fatigue life estimation less than a threshold value of fatigue life.

25. The computer system according to claim 14, wherein applying the function comprises:
  receiving one or more design constraints as inputs; and
  ensuring that the one or more design constraints are not exceeded for the combination.

26. The computer system according to claim 25, wherein the one or more design constraints comprise one or more design constraints selected from the following: maximum hub height; minimum hub height; maximum blade length; minimum blade length; minimum power demand; maximum power demand; maximum ultimate mechanical loading of one or more components of the wind turbine; maximum fatigue loading of one or more components of the wind turbine; and maximum electrical loading of one or more components of the wind turbine.

* * * * *